Figure 1:
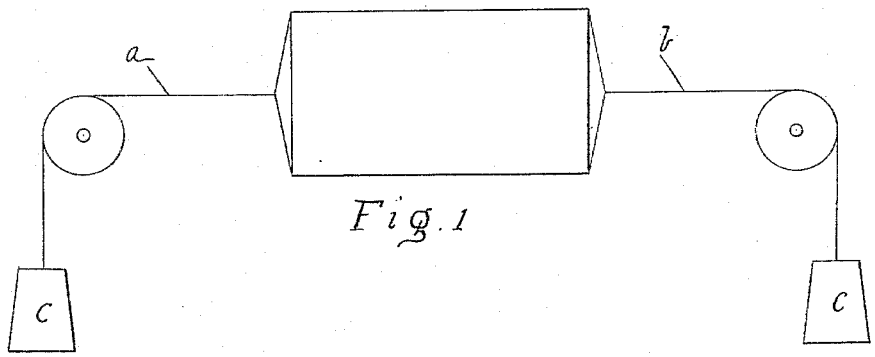

(No Model.)

O. ASCHE.
PROCESS OF TESTING AIR TIGHTNESS OF CLOSED OR FILLED TIN CANS.

No. 597,233. Patented Jan. 11, 1898.

WITNESSES
Jas. A. Richmond
Robert Pass

INVENTOR
Otto Asche
by G. Dittmar
Attorney

UNITED STATES PATENT OFFICE.

OTTO ASCHE, OF PARIS, FRANCE.

PROCESS OF TESTING AIR-TIGHTNESS OF CLOSED OR FILLED TIN CANS.

SPECIFICATION forming part of Letters Patent No. 597,233, dated January 11, 1898.

Application filed April 3, 1897. Serial No. 630,641. (No model.)

*To all whom it may concern:*

Be it known that I, OTTO ASCHE, a citizen of the French Republic, residing at Paris, France, have invented certain new and useful Improvements in Processes for Testing the Perfect Air-Tightness of Closed and Filled Conserving-Tins and other Cans; and I do hereby declare the following to be a full, clear, and exact description of the invention, such as will enable others skilled in the art to which it appertains to make and use the same.

My invention has for its object to provide an efficient, accurate, and economical method for testing cans after they have been filled and closed, but before they have been submitted to the action of the boiler or sterilizer.

My invention consists, broadly, in swelling out one or both of the can-heads by external power, thus increasing the volume of the can, and then releasing it from the action of said power, as fully described hereinafter and afterward specifically pointed out in the claims.

The usual method of packing, sealing, and sterilizing cans of such nature is to first prepare the can to receive the goods, then to fill the can, then to seal it, and then to boil, process, or sterilize the contents. When the cans, after being boiled, come from the boiler or sterilizing apparatus, it can be observed that the heads of tight cans have been changed in and have taken a convex form and that the heads of leaking cans have not changed from their concave form. The reason for the convexity in the first case is that the contents of the can expand when heated, and as vapors are formed in the inner space pressure in an outward direction is exerted on the heads, and when the cans are cooled off the bulged heads regain their original position. In the second case, however, the inner gases having been able to escape through the leak, no such pressure is exerted, and consequently no convexity is formed, and when the contents cool, liquid from the sterilizer or air from the atmosphere is allowed to enter and mix with the contents, thus spoiling the same. It is therefore preferable to test the cans before they undergo the sterilizing process. Defective cans, which are easily detected by my improved testing method, can be reopened and the contents can be saved, while otherwise they would decompose and would be entirely lost when they are brought upon the market.

In carrying out my process I first prepare the cans, then fill them, then apply the testing process, and finally submit only the tight cans to the boiling or sterilizing process, leaving all leaking cans, as discovered by the testing process, to be resealed or repaired, if necessary, and again submitted to the testing before boiling, so that a leaking can never gets into the apparatus for boiling or sterilizing, nor does it reach the hands of the consumer.

Cans almost invariably have their heads so shaped by stamping during the process of manufacture that they are, when placed in position as parts of the cans, of concave form, their central portions curving inward, the purposes of such formation being well known. These concavities are not of an extreme depth, which would render the heads absolutely rigid, but being shallow the heads are to a certain extent elastic, and their form is readily changed from concave to convex—as, for instance, when the contents of a sealed can have fermented, when the can becomes what is technically termed a "swell-head" and is rejected.

In my process I take a filled and closed can and subject it to the action of any external power adapted to slightly increase its volume. This is preferably done by drawing out one or both heads by applying to the latter, for instance, electromagnets placed adjacent to the center portions of the heads. I may also employ wires secured to the center portions of the heads by soldering, as shown in the accompanying drawings, in which—

Figure 2:
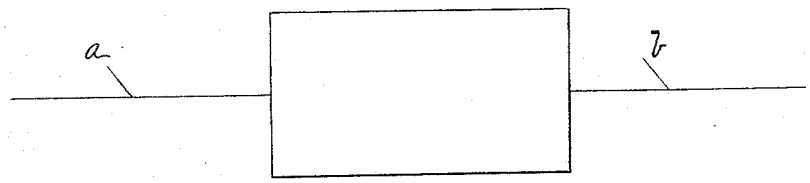

Figure 1 is a can under the action of the power adapted to increase the volume, and Fig. 2 is a can when released from said action.

The wires $a$ and $b$ are subjected to a pull in opposite directions by heavy weights $c\ c$ or otherwise. I may also use an air-pump or other pneumatic apparatus, in communication with a space upon which the cans may be placed; but any other suitable power may be used for swelling the heads outwardly, and as such selection of the power forms no part of my present invention I have shown only one form in the drawings as an example. I do not confine myself to any one or all of them, but I reserve the right to use any power whatever which may or can be used to produce the desired effect. When thus one or both heads are drawn outward, swelled, or convexed, the volume of the can is evidently increased. This with a perfectly tight can forms a partial vacuum inside of the can, and when the can is released from the action of the external power the head or heads immediately fly back to their original concave form.

Should the can being tested be imperfect, from bad metal, poor workmanship in bending the metal from which it is made, faulty solder or soldering, or any other cause, air will enter through the leak, and the admission of the outer air through such leaks during the period of carrying on the swelling out of the heads will neutralize the partial vacuum inside the can, so that when released from the swelling or convexing power the head or heads will fail to return to the concave form and the can will remain a swell-head and before boiling or sterilizing may be repaired and retested, thus avoiding loss of its contents.

What I claim as new, and desire to secure by Letters Patent of the United States, is—

1. The method herein described of testing closed and filled cans, which consists in producing in a can a partial vacuum by increasing its volume and then allowing the can to reassume its original volume and shape.

2. The method herein described of testing closed and filled cans, which consists in producing in a can a partial vacuum, in bulging out the head under the strain of power outwardly applied thereto, so that through existing leaks air will pass in to fill up said partial vacuum and to prevent the heads from returning into their original position when released from the power having produced said partial vacuum.

3. The method herein described of testing closed and filled cans, which consists in swelling outwardly or convexing a can-head by outwardly-applied power to produce a partial vacuum inside the can and then releasing the can-head from the action of such power substantially as described and for the purpose set forth.

In testimony whereof I affix my signature in presence of two witnesses.

OTTO ASCHE.

Witnesses:
GUSTAVE GOBRON,
PINN EARHARD.